US008401252B2

(12) United States Patent
Schneiderman et al.

(10) Patent No.: US 8,401,252 B2
(45) Date of Patent: Mar. 19, 2013

(54) VIDEO RETRIEVAL SYSTEM FOR HUMAN FACE CONTENT

(75) Inventors: Henry Schneiderman, Pittsburgh, PA (US); Michael C. Nechyba, Pittsburgh, PA (US); Uriel G. Rodriguez, Pittsburgh, PA (US); Louis D. Brandy, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/972,831

(22) Filed: Dec. 20, 2010

(65) Prior Publication Data

US 2011/0170749 A1 Jul. 14, 2011

Related U.S. Application Data

(62) Division of application No. 11/540,619, filed on Sep. 29, 2006, now Pat. No. 7,881,505.

(51) Int. Cl.
*G06K 9/00* (2006.01)

(52) U.S. Cl. ....................................................... 382/118

(58) Field of Classification Search ........................ None
See application file for complete search history.

(56) References Cited

U.S. PATENT DOCUMENTS

| 5,136,655 | A | 8/1992 | Bronson |
| 5,835,667 | A | 11/1998 | Wactlar |
| 6,711,587 | B1 | 3/2004 | Dufaux |
| 6,829,384 | B2 | 12/2004 | Schneiderman et al. |
| 2004/0066966 | A1 | 4/2004 | Schneiderman |
| 2004/0117638 | A1* | 6/2004 | Monroe ........................ 713/186 |
| 2005/0265581 | A1* | 12/2005 | Porter et al. .................... 382/103 |
| 2006/0088207 | A1 | 4/2006 | Schneiderman |
| 2006/0110128 | A1 | 5/2006 | Dunton et al. |
| 2006/0146062 | A1* | 7/2006 | Kee et al. ....................... 345/582 |
| 2006/0251292 | A1* | 11/2006 | Gokturk et al. ................ 382/103 |
| 2008/0065701 | A1* | 3/2008 | Lindstrom et al. ............. 707/201 |
| 2011/0032353 | A1* | 2/2011 | Vallone et al. ................. 348/143 |

OTHER PUBLICATIONS

Smith et al., "Interactive Content-based Retrieval of Video", IEEE ICIP (2002), pp. I-976 to I-979.
Wactlar et al., "Intelligent Access to Digital Video: Informedia Project", IEEE Computer (May 1996), pp. 46-52.
Forsyth, D. A. et al., Computer Vision: A Modern Approach, Chapter 6, pp. 153-170, (2003).
Shapiro, Linda et al., Computer Vision, Prentice Hall (2001), pp. 56-63, 253-254, and 431-444.
Schneiderman et al., "Real-Time Model-Based Visual Tracking", Proceedings Intelligent Robotic Systems, Grenoble, France, (Jul. 11-15, 1994).

* cited by examiner

*Primary Examiner* — Vikkram Bali
*Assistant Examiner* — Fred Hu
(74) *Attorney, Agent, or Firm* — Wolff & Samson PC

(57) ABSTRACT

A method and apparatus for video retrieval and cueing that automatically detects human faces in the video and identifies face-specific video frames so as to allow retrieval and viewing of person-specific video segments. In one embodiment, the method locates human faces in the video, stores the time stamps associated with each face, displays a single image associated with each face, matches each face against a database, computes face locations with respect to a common 3D coordinate system, and provides a means of displaying: 1) information retrieved from the database associated with a selected person or people, 2) path of travel associated with a selected person or people, 3) interaction graph of people in video, 4) video segments associated with each person and/or face. The method may also provide the ability to input and store text annotations associated with each person, face, and video segment, and the ability to enroll and remove people from database. The videos of non-human objects may be processed in a similar manner. Because of the rules governing abstracts, this abstract should not be used to construe the claims.

38 Claims, 8 Drawing Sheets

FIG. 5

VIDEO RETRIEVAL SYSTEM FOR HUMAN FACE CONTENT

CROSS REFERENCE TO RELATED PATENTS AND APPLICATIONS

This application is a divisional of and claims priority benefit under 35 U.S.C. §120 to the U.S. patent application Ser. No. 11/540,619, filed on Sep. 29, 2006 and titled "A Video Retrieval System for Human Face Content," the disclosure of which is incorporated herein by reference in its entirety. The disclosure in the present application is related to (i) the U.S. Pat. No. 6,829,384, issued on Dec. 7, 2004 and titled "Object Finder for Photographic Images," (ii) the U.S. Pat. No. 7,194,114, issued on Mar. 20, 2007 and titled "Object Finder for Two-Dimensional Images, and System for determining a Set of Sub-Classifiers Composing an Object Finder", and (iii) the United States Patent Application Publication No. US2006/0088207, titled "Object Recognizer and Detector for Two-Dimensional Images using Bayesian Network Based Classifier"; the disclosures of these three publications are also incorporated herein by reference in their entireties.

BACKGROUND

1. Field of the Disclosure

The present disclosure generally relates to a video search and retrieval system, and, more particularly, to an apparatus and method that uses faces as a primary index or cueing mechanism into video data, where faces are located, extracted, and matched automatically.

2. Brief Description of Related Art

Vast amounts of video data exist. These include those produced for commercial consumption, those produced for personal and home uses, and those recorded for the purposes of security and monitoring.

The needs to monitor live video and to search recorded video are pressing ones. Most home video and security video are labeled with a minimal amount of descriptive information, often only a title and date. The lack of descriptive information makes searching a video archive for a particular event or person a burdensome undertaking. For example, if a theft occurs during the night in a large office complex, the process of finding suspects by reviewing the overnight-recorded video from security cameras will be very time consuming due to the number of cameras that may have recorded the suspect, the large time period (e.g., 8-10 hours of the night) during which the theft may have occurred, and the essentially sequential review of the contents of individual video tapes or discs. A similar need to search video arises in many other circumstances including, for example, live monitoring of security cameras, monitoring employee behavior in cases of suspected employee theft, reviewing actions of people in a secure facility such as a military base, monitoring of company headquarters, or school, reviewing behavior of patients and staff in a medical care facility, searching for family and friends in a home video, searching video archives on the Internet, and searching consumer or sports video archives such as those of broadcast or cable video.

There are few automatic tools that can help users automatically identify events of interests in live and recorded video. Existing methods for searching, navigating, and retrieving video have focused on broadcast video produced for mass consumer consumption. See, for example, the discussion in "Intelligent Access to Digital Video: The Informedia Project" by Wactlar, H., Stevens, S., Smith, M., Kanade, T., IEEE Computer, 29(5), Digital Library Initiative Special Issue., May, 1996; and in "Interactive Content-based Retrieval of Video," Smith, J. R., Basu, S., Lin, C.-Y., Naphade. M., Tseng. B., IEEE International Conference on Image Processing (ICIP-2002), September, 2002. The methods disclosed in these publications are designed for high quality broadcast video where the video content consists of heterogeneous video segments from many sources spliced together in small topical segments and video indexing relies on transcripts obtained from close-captioning and/or speech recognition. Furthermore, some existing methods of analysis of the visual component of video are limited to detecting video shot boundaries and face detection is carried out for identifying key frames, where a keyframe is a single frame representative of a shot. Such methods are discussed, for example, in U.S. Pat. No. 6,711,587 to Dufaux, F., titled "Keyframe Selection to Represent a Video," and U.S. Patent Application Publication No. US2006/0110128 to Dunton et al., titled "Image-key index for Video Program Stored in Personal Video Recorder."

Hence, it is desirable to devise a video search, retrieval and cueing methodology that uses face or object detection techniques to automatically create an index of human faces or objects-of-interest that appear in the video. It is also desirable for the video search methodology to allow a user to selectively view video segments associated with a specific human face or object without performing a time-consuming search of the entire video for those video segments.

SUMMARY

In one embodiment, the present disclosure contemplates a method for processing video data. The method comprises detecting human faces in a plurality of video frames in the video data, and, for at least one detected human face, identifying all frames in which this face is present irrespective of whether the detected human face is present in these "face-specific" set of video frames in a substantially temporally continuous manner. The method further comprises: grouping video frames in the face-specific set of video frames into a plurality of face tracks, wherein each face track contains corresponding one or more video frames having at least a substantial temporal continuity therebetween; and merging two or more of the plurality of face tracks that are disjoint in time using a face recognition method based on a Bayesian Network based classifier. The method also comprises enabling a user to view face-specific video segments of the detected human face in the video data based on the merging of temporally disjoint face tracks.

In another embodiment, the present disclosure contemplates another method for processing video data. The method comprises detecting human faces in a plurality of video frames in the video data and indicating one or more unmatched human faces in the detected human faces based on a comparison of the detected human faces against a plurality of human face images stored in a database. The method further includes tracking of at least one unmatched human face across the video data by locating a face-specific set of video frames therefor using a face recognition method based on a Bayesian Network based classifier, irrespective of whether the unmatched human face is present in the face-specific set of video frames in a substantially temporally continuous manner.

The present disclosure also contemplates a data storage medium containing a program code, which, when executed by a processor (e.g., a processor in a computer or similar other digital data processing unit), causes the processor to perform the various method steps discussed herein so as to identify and display various face-specific video segments in the input video data. A computer system suitably programmed to perform these method steps is also contemplated herein. A system that includes a computing unit and a data storage medium containing appropriate program code for processing video data according to the teachings of the present disclosure is also contemplated herein.

In a further embodiment, the present disclosure contemplates a method of processing video data that may be carried out over a data communication network (e.g., the Internet). The method comprises receiving video data from a user over a data communication network, and detecting human faces in a plurality of video frames in the video data. For at least one detected human face, the method comprises identifying a face-specific set of video frames irrespective of whether the detected human face is present in the face-specific set of video frames in a substantially temporally continuous manner. The method further includes using face recognition based on a Bayesian Network based classifier to identify those portions of the video data corresponding to the face-specific set of video frames wherein the at least one detected human face is present, and sending cueing information for the portions of the video data to the user over the data communication network so as to enable the user to selectively view face-specific video segments in the video data associated with the at least one detected human face without a need to search the video data for the video segments.

The present disclosure also contemplates a system wherein a video data source (e.g., a video camera and/or a computing unit) is in communication with a video data processing computer via a communication network (e.g., the Internet). The video data from the video data source may be processed by the video data processing computer, which then sends face-specific video segments or other cueing information over the communication network to the video data source for further review.

Besides or instead of human faces, other objects of interest (e.g., cars, specific animals, etc.) may be detected in the video data to generate object-specific segments for further display and review. In one embodiment, the present disclosure contemplates a method for processing video data, wherein the method comprises detecting objects in a plurality of video frames in the video data, and, for at least one detected object, identifying an object-specific set of video frames irrespective of whether the detected object is present in the object-specific set of video frames in a substantially temporally continuous manner. The method further comprises: grouping video frames in the object-specific set of video frames into a plurality of object tracks, wherein each object track contains corresponding one or more video frames having at least a substantial temporal continuity therebetween; and merging two or more of the plurality of object tracks that are disjoint in time using an object recognition method based on a Bayesian Network based classifier. The method also includes enabling a user to view object-specific video segments of the detected object in the video data based on the merging of temporally disjoint object tracks.

The present disclosure relates to an apparatus and method for searching, navigating, and monitoring video data by automatically creating an index of the people who appear in the video. People in the video are identified using their faces. For each such person, the system automatically provides the means for viewing the video segments in which that person appears. Because multiple people may be present at any one time in video, the system may provide multiple indices to particular video segments. A face mining method according to one embodiment of the present disclosure may include one or more of the steps of finding faces in individual video frames, grouping the found faces to unique people, matching face data for each unique person to a database of face images thereby associating a data record to each matched person, charting movement and interaction of people with respect to a facility map (e.g., map of a warehouse or an office complex), and presenting an interactive display. In various embodiments, the interactive display may be configured to show different items including, for example, single images representing each unique person found, single images representing each video segment associated with each person, video segments associated with each face and person, text data for each video segment such as title, date, time of video, etc., text data for each person found in database such as name, time of entry in building, occupation, authorization level, etc., interaction graph of people in the video, and paths of travel of people visualized on 2D (two dimensional) maps. The interactive display interface may provide the ability for operators to perform various tasks including, for example, input and storage of text annotation for each person, input and storage of text annotation for each video segment, enrollment of people in database, removal of people from database, and manual matching of people to database (when system fails to make a match to database).

BRIEF DESCRIPTION OF THE DRAWINGS

For the present disclosure to be easily understood and readily practiced, the present disclosure will now be described for purposes of illustration and not limitation, in connection with the following figures, wherein:

FIG. 5 illustrates an exemplary implementation of the people index screen in the interactive graphical interface;

DETAILED DESCRIPTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical video processing systems.

Figure 1:
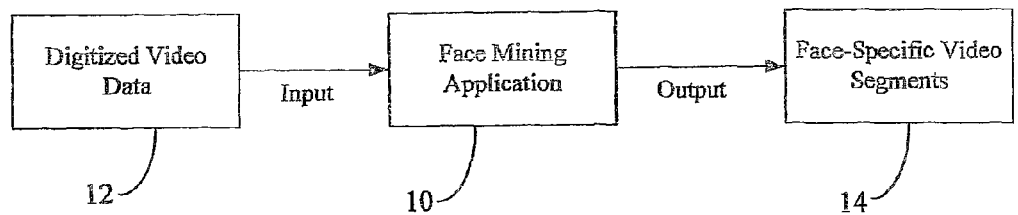
FIG. 1 is an embodiment of a generalized operational flow for a face mining application according to one embodiment of the present disclosure.

FIG. 1 illustrates an embodiment of a generalized operational flow for a face mining application 10 (hereinafter "face miner") according to one embodiment of the present disclosure. The face mining application or program is represented by the block 10 and may be a software module having various video data processing functionalities as discussed later hereinbelow. Preferably, in one embodiment, a digitized video data 12 is a typical input to the face miner 10, which operates on the video 12 and generates face-specific video segments 14 associated with various human faces detected in the video data 12. In an alternative embodiment, the face mining software 10 may generate cueing or indexing information, which may function as a pointer for or link to the respective face-specific video content (in the video data 12) identified by the face mining software 10. A user may use this pointer or link (not shown) to access the related face-specific video segments. It is noted here that although digitized video 12 is shown as an input for the face miner 10, the video may be in the analog form, which may then be converted into digital form prior to processing by the face mining program 10. The video data 12 preferably contains 2D (two dimensional) images of one or more 3D (three dimensional) objects (e.g., human faces, cars, etc.). The input video data may be live streaming video or video files digitized in one of many possible video file formats including, for example, an MPEG (Motion Picture Experts Group) file format, an AVI (Audio Video Interleaved) file format, a WMV (Windows Media Video) file format, a JPEG (Joint Photographic Experts Group) file format, an uncompressed RGB video data, or any other suitable media file format for video contents.

Figure 2:
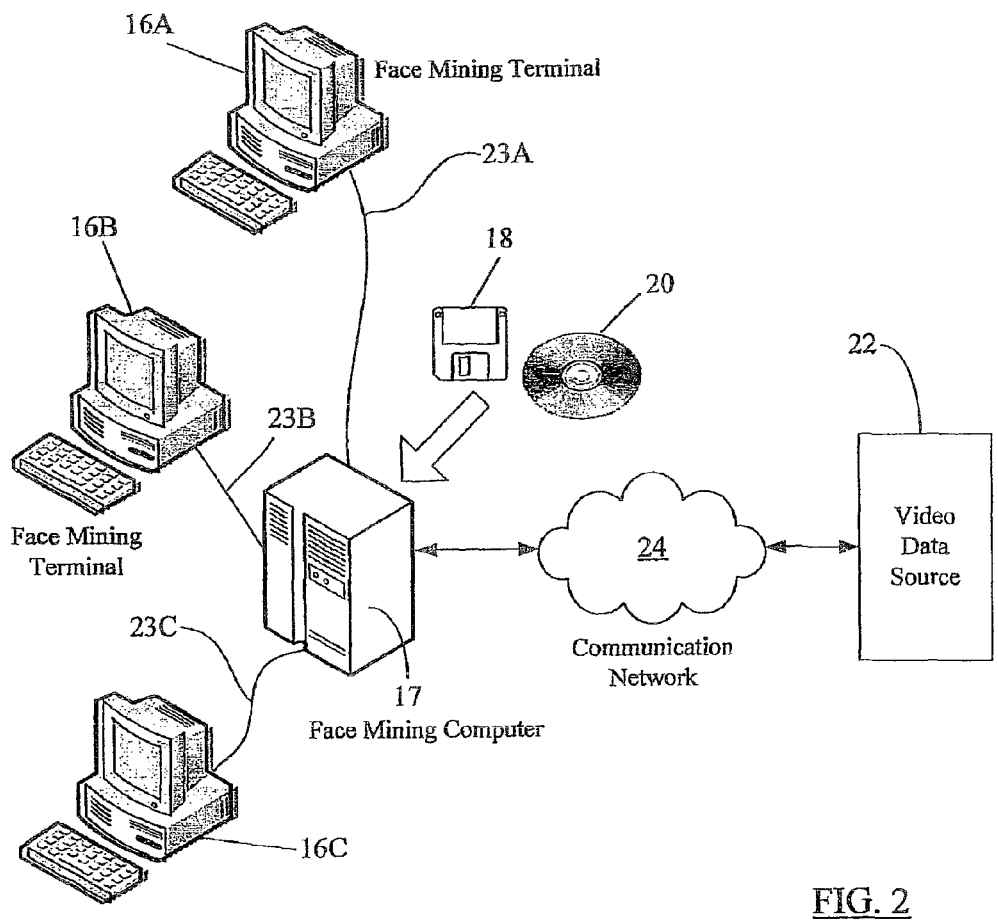
FIG. 2 illustrates an exemplary setup to utilize the face mining program according to one embodiment of the present disclosure.

FIG. 2 depicts an exemplary setup to utilize the face mining program 10 according to the present invention. A computer or computing device 17 may execute or "run" the face mining program 10 when instructed by a user through a face mining terminal 16 (which could be any one of the terminals 16A-16C) or automatically when a triggering event occurs (e.g., when video data is received, or between certain time periods every day, etc.). For the ease of discussion, the reference numeral "16" is used herein to refer to the terminals 16A-16C, jointly and severally. In a practical application, there may be many more different face mining terminals 16 than just three terminals shown in FIG. 2 as can be appreciated by one skilled in the art. In one embodiment, the computer 17 may have a portion thereof configured to record video data 12. For example, a built-in camera unit (not shown) may allow the computer 17 to function as a video recorder. Alternatively, an external video camera unit (not shown) may be coupled to the computer 17 to provide the video data 12 thereto. In a different embodiment, the computer 17 may have the video data 12 pre-stored therein (e.g., a pre-recorded video on the hard drive of the face mining terminal 17) prior to processing by the face mining application 10. The input video data 12 may first be displayed on the computer terminal or monitor display screen (e.g., the display screens of face mining terminals 16) and, after application of the face mining program 10, one or more specialized display screens (e.g., the people index screen 45 in FIG. 5) may be displayed on the display screens of face mining terminals 16. The program code for the face mining program application 10 may be initially stored on a portable data storage medium, e.g., a floppy diskette 18, a compact disc 20, a data cartridge tape (not shown), or any digital data storage medium. The face miner computer 17 may include appropriate disk drives to receive the portable data storage medium and to read the program code stored thereon, thereby facilitating execution of the face mining software 10. The face miner 10, upon execution by the computer 17, may cause the computer 17 to perform a variety of video data processing and display tasks including, for example, analysis and processing of the input video data 12 for detection of human faces, display of various interactive display screens to enable a user to view face-specific video segments from the video data or to view video segments associated with only non-recognized (or unmatched) human faces in the video data, transmission of the video data processing results to a remote computer site 22 (discussed in more detail hereinbelow), etc. The face mining terminals 16A-16C may be communicatively connected to the face mining computer 17 via corresponding data communication links 23A-23C, which can be serial, parallel, or wireless communication links, or a suitable combination thereof, as desired by the system designer. In one embodiment, one of the terminals 16A-16C may be configured to function as the face mining computer 17.

As illustrated in FIG. 2, in one embodiment, the face mining computer 17 may be remotely accessible from a client computer site or video data source 22 via a communication network 24. In one embodiment, the communication network 24 may be any data communication network such as an Ethernet LAN (local area network) connecting all the computers within a facility, e.g., a university research laboratory, a corporate headquarter, or a corporate data processing center. In that case, the face mining computer 17 and the video data source 22 may be physically located at the same site, e.g., a university research laboratory or a corporate warehouse. In alternative embodiments, the communication network 24 may include, independently or in combination, any of the present or future wireline or wireless data communication networks, e.g., the Internet, the PSTN (public switched telephone network), a cellular telephone network, a WAN (wide area network), a satellite-based communication link, a MAN (metropolitan area network), etc.

The face miner computer 17 may be, e.g., a personal computer (PC), a graphics workstation, a multiprocessor computer system, a distributed network of computers, or a computer chip embedded as part of a machine or mechanism (e.g., a computer chip embedded in a digital camera, in a traffic control device, etc.). Similarly, the computer (not shown) at the remote client site 22 and each face mining terminal 16A-16C may also be, capable of viewing and manipulating digital video files transmitted by the face mining computer 17. In one embodiment, as noted hereinbefore, the client computer site 22 may also include a face mining computer (not shown), which can function as a server computer and can be accessed by other computers at the client site 22 via a LAN. Alternatively, the client site 22 may just include one or more face mining terminals (not shown) feeding video data to be analyzed to the face mining computer 17 via the communication network 24. Each computer—the face mining computer 17, each of the face mining terminals 16A-16C, and the remote computer (not shown) at the client site 22—may include requisite data storage capability in the form of one or more volatile and non-volatile memory modules. The memory modules may include RAM (random access memory), ROM (read only memory) and HDD (hard disk drive) storage. Memory storage is desirable in view of sophisticated image processing and graphics display performed by the face mining computer 17 as part of the input video data processing.

In one embodiment, the face mining computer 17 includes: (i) an ASUS K8N-DL motherboard; (ii) two AMD dual-core Opteron 270 CPUs (central processing units), each operating at 2.0 GHz; (iii) two random access memory (RAM) cards, each 1 GB DDR SDRAM ECC (PC3200) marketed as Kingston memory Model KVR400D4R3A/1G; (iv) an ASUS EN7900GTX/512M video card; (v) a Hauppauge Impact VCB Model 558 frame grabber; (vi) a Seagate Barracuda ST3500641AS (7200 RPM, 500 GB, SATA 3.0 Gb/s) hard drive; (vii) a Sony IDE DVD-ROM model DDU1615/B2s; (viii) a Samsung 1.44 MB, 3.5" internal floppy drive; (ix) an Athena Power EPS12V, 550W Model AP-P4ATX55FE power supply; and (x) an Antec P180 case enclosing the components mentioned in items (i) through (ix). An external camera marketed as Honeywell Camera Kit Model HKPC4V9 also may be attached to the face mining computer 17 with the foregoing configuration to capture and send video data thereto. A suitable computer monitor or display screen may be provided for various system displays.

In one embodiment, the remote video data source 22 may include one or more video cameras (not shown) configured to provide video data (e.g., streaming video, or real-time video content) to the face mining computer 17 via the communication network 24. In an alternative embodiment, the video data source or client site 22 may include a computing unit (not shown) connected to an external or internal video capture device (e.g., a video camera) to initially receive the video data (which may be in the analog form to be converted into digital format by the computing unit at the client site) therefrom and prepare the video content to be sent to the face mining computer 17 for further processing and analysis according to the teachings of the present disclosure given hereinbelow. Alternatively, a computing unit (not shown) with a pre-stored video content (e.g., video clips earlier downloaded in a computer memory from a camera or non-camera source) may function as the video data source 22.

Before discussing how the face mining process is performed by the face mining software 10 according to one embodiment of the present disclosure, it is noted that the arrangement depicted in FIG. 2 may be used to provide a commercial, network-based video processing service that may perform customer-requested face detection and video processing in real time or near real time. For example, the face mining program 10 at the computer 17 may be configured to detect human faces in the video data remotely submitted to it over the communication network 24 (e.g., the Internet) by the video data source 22 automatically or through an operator at the client site 22. The client site 22 may be, for example, a video surveillance facility specializing in video monitoring of commercial or government premises. In that case, the face mining computer 16 may first automatically detect all human faces in the video data submitted and then identify face-specific video segments in the video data. The face mining computer 17 may then send the video processing results including separate face-specific video segments or tracking information for unmatched faces in the received video data to the client computer site 22, which can then automatically display relevant video segments to a user so as to enable the user to identify unmatched human faces in the surveillance video without manually (and, most probably, sequentially) searching the entire surveillance video for suspicious persons. Thus, the whole video analysis process can be automated. As another example, the face mining computer 17 may be a web server running the face mining software application 10. The client site 22 may be in the business of providing commercial, on-demand video processing for individual clients (e.g., processing of home videos) or corporate clients (e.g., processing of a corporate surveillance video). The client site 22 may send the video files to be processed to the face mining computer 17. The face mining computer 17, in turn, may process the received video and automatically generate a face-specific analysis of the content of each received video. The results of video analysis may then be transmitted back to the sender computer at the client site 22 for submission to its respective clients.

It is noted that the owner or operator of the face mining computer 17 may commercially offer a network-based face-specific video content analysis service, as illustrated by the arrangement in FIG. 2, to various individuals, corporations, or other facilities on a fixed-fee basis, on a per-operation basis or on any other payment plan mutually convenient to the service provider and the service recipient.

Figure 3:
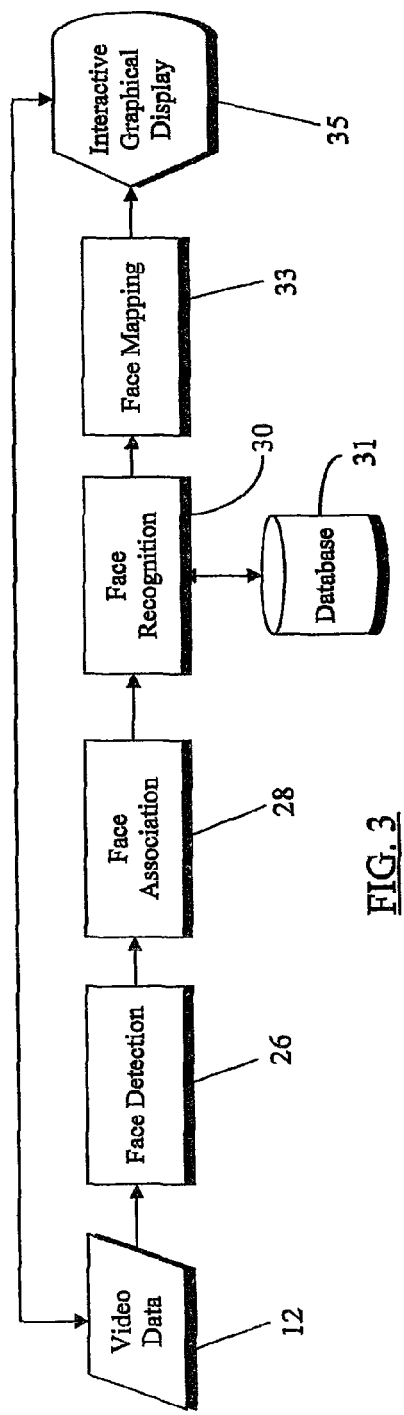
FIG. 3 is an overall schematic diagram of major components in a system implementing the face mining application according to one embodiment of the present disclosure.

FIG. 3 is an overall schematic diagram of major components in a system implementing the face mining application 10 according to one embodiment of the present disclosure. As noted before, the face-based video retrieval software constituting the face mining application 10 may be embodied in a computer system (e.g., the computer system 17 in FIG. 2) or an equivalent electronic system capable of digital computation. The input to the apparatus (e.g., the computer system 17) may consist of video data 12. As noted before, the input video data 12 may be in digital or analog form. If in analog form, a means (not shown) for digitizing and storing digitized video may be required to facilitate further video processing by the remaining software modules in the system. The video data 12 may be received from a single or multiple videos sources and it may consist of live video that is recorded as it is received. The video data 12 may be stored on disk drive, or other digital storage device and may be received via direct connection to cameras, transmitted via wireless network, wired network, cable, broadcast, or satellite transmission.

In the embodiment of FIG. 3, the face mining software 10 is shown to include four modules: a face detection module 26, a face association module 28, a face recognition module 30, and a face mapping module 33. The face detection module 26 may be configured to locate faces in the individual video frames in the input video sequence. Some exemplary methods of face detection are described in U.S. Pat. No. 6,829,384, titled "Object Finder for Photographic Images", the U.S. Pat. No. 7,194,114, titled "Object Finder for Two-Dimensional Images, and System for Determining a Set of Sub-Classifiers Composing an Object Finder," and United States Patent Application Publication No. US2006/0088207, titled "Object Recognizer and Detector for Two-Dimensional Images using Bayesian Network Based Classifier." The disclosures of all three of these publications have been incorporated herein by reference in their entireties. In one embodiment, the face detection module 26 may utilize the methods of face detection disclosed in these publications.

For each video frame in the input video data 12, the face detection module 26 outputs a list of records ("face detection records") associated with each detection and consisting of the detected location (e.g., an x-y coordinate value) of the face within the image, the size of the face in pixels within the image, the orientation of the face (for example: frontal, left profile, right profile, etc.), and the numerical confidence that the face detector in the detection module 26 believes that the detected object is a human face.

The face association module 28 groups together face detections that are generated from each unique person in the input video 12. For example, when someone enters the field of view of a video capture device (e.g., a video camera), his/her face may appear in many successive video frames. Moreover, that person may then exit the field of view and reappear at a later time in another series of video frames. A purpose of the face association module is to group all detected faces of each unique person present in the video by identifying preferably only those video frames in the input video data 12 in which the person of interest appears. The group or set of video frames in which a specific person's face appears may be conveniently referred to as a "face-specific" group/set of video frames.

The face association module 28 may use principles of spatial and temporal continuity to combine single-frame observations into "face tracks", each of which is associated with a particular person. In one embodiment, face tracks are obtained using the object tracking method described in "Real-Time Model-Based Visual Tracking", Schneiderman, H., Wavering, A. J., Nashman, M., and Lumia, R., Proceedings Intelligent Robotic Systems '94, the disclosure of this publication is incorporated herein by reference in its entirety. In one embodiment, each face track may consist of the sequence of face detections (in video frames) that have been grouped together. In a face track, each detection record may be stored along with its frame number/time stamp, a description of the motion (position, velocity, acceleration) as determined by the tracking method, as well as a confidence measurement (also determined by the object tracking method) that the face is present in a given video frame.

The object tracking method mentioned in the preceding paragraph will group face detections of a person when the person's face is substantially temporally continuously or nearly continuously present in the video. Such a method, however, may not be able to group together sightings of a particular person that are disjoint in time, for example, when someone leaves the video capture device's field of view and later reappears after an extended absence. In such a situation, further processing steps, as described hereinbelow, may be carried out to group and combine video frame-based face tracks that are disjoint in time.

In one embodiment, the extracted face tracks are matched and merged based on the color signature of a person (i.e., the object of interest in the set of video frames being analyzed). The process of merging relates to appending one track to the other track in chronological order. The color signature of a person may be extracted by segmenting the portions of each video frame containing the moving person by using image subtraction followed by connected component analysis. These methods are well-known in the art and use standard computer vision algorithms described in various textbooks such as, for example, the book titled "Computer Vision", by Linda G. Shapiro and George C. Stockman. Prentice-Hall, 2001. The relevant disclosure of this textbook is incorporated herein by reference in its entirety. Image differencing followed by connected components analysis will segment (i.e., separate) each set of pixels believed to be associated with a particular person. The color signature-based face matching method implemented by the face association module 28 then can compare any two face tracks on the basis of their segmented pixels.

In one embodiment, face tracks are compared using the mean color value ($m_j$) and the covariance ($C_j$) of their associated pixels. This method computes the Mahalanobis distance ($d_i$) of the mean ($m_j$) of one track to the mean ($m_i$) of another track as given by equation-1 below:

$$d_j = (m_j - m_i)^t C_i^{-1} (m_j - m_i) \quad (1)$$

The face track comparison method then decides whether to merge two tracks, for example tracks "i" and "j", by comparing the sum of the two Mahalanobis distances ($d_i + d_j$) to a threshold. If this sum is less than the threshold, the two tracks are merged. If this sum is greater than the threshold than they are considered separate tracks. The value of threshold value may be chosen empirically. A large threshold (e.g., greater than 10.0) value may result in merger of most of the tracks of each particular person, but may increase the number of incorrect merges where tracks of different people are merged. Conversely, a smaller threshold value may avoid making many incorrect merges, but may fail to merge tracks of the same person. Therefore, depending on the needs of the application, a designer can choose the threshold to achieve a desirable compromise between failures to merge and incorrect merges.

In computing the mean and covariance of the segmented pixel, the color of each pixel can be represented by its RGB values; that is its red, green, and blue values. The RGB representation is the typical output from most color cameras. However, the level of illumination may differ across tracks. In an alternative embodiment, the mean and covariance computation method according to one embodiment of the present disclosure transforms the RGB values into other representations such as YIQ and YUV that separate luminance/intensity from chrominance. The method then removes the luminance component (Y) from chosen representation and performs the computations of mean, covariance, and Mahalanobis distance described above on the remaining components of the color representation. It is known in the art that in the NTS color model-based YIQ representation, "Y" refers to perceived luminance, and "I" and "Q" jointly refer to values of color and luminance. The YUV representation refers to values of luminance, bandwidth, and chrominance.

In one embodiment of the present disclosure, the face association module 28 merges face tracks using a face recognition means (e.g., the face recognition module 30) in addition to or instead of color signatures. In this embodiment, the face recognition method described in the earlier-mentioned United States Patent Application Publication No. US2006/0088207, titled "Object Recognizer and Detector for Two-Dimensional Images using Bayesian Network Based Classifier," is used. The Bayesian Network based classifier used for face detection may be generated using the following method: computing a wavelet transform of each of a plurality of 2D images, wherein each the wavelet transform generates a corresponding plurality of transform coefficients; creating a plurality of candidate subsets of the transform coefficients; selecting a group of candidate subsets from the plurality of candidate subsets; and constructing the classifier based on a ratio of a plurality of Bayesian networks using the group of candidate subsets.

In one embodiment, the face recognition module 30 matches the data from the merged face tracks against face images stored in a database 31. The database 31 may contain a reference set of facial images of persons who may enter the video capture device's field of view (i.e., whose video may be recorded by the video capture device (not shown)). The database 31 may reside on a disk drive or some other suitable form of digital storage (e.g., in a hard drive of the face mining computer 17). When the face recognition module 30 finds a match between a face in an input video frame and a reference face image stored in the database 31, it retrieves from the database 31 a stored record ("Person Record") of known information about the matched person. Again, as mentioned before, in one embodiment, the face recognition module 30 may use the method of face recognition described in the earlier-mentioned United States Patent Application Publication No. US2006/0088207, titled "Object Recognizer and Detector for Two-Dimensional Images using Bayesian Network Based Classifier".

The face mapping module 33 is configured to compute the positional coordinates of each detected face with respect to a single positional coordinate frame of reference, for example, a frame with respect to a map of the site (e.g., a warehouse or a corporate office facility) in which the cameras are present.

In order to compute the position of each face with respect to this map, the module 33 first computes the location of every face with respect to a three dimensional coordinate frame measured with respect to the camera or other suitable video capture device (not shown). This location computation assumes that all faces are approximately of the same size and that the focal length of the camera is known. The focal length is usually supplied with the camera's operating manual. It can also be determined empirically using well known camera calibration methods. The position and orientation of the camera to an external three dimensional (3D) coordinate system defined with respect to the site may also be determined. Standard calibration methods for determining camera position and orientation with respect to such an external coordinate system exist in many textbooks including, for example, the book titled "Computer Vision", by Linda G. Shapiro and George C. Stockman, Prentice-Hall, 2001, and the book titled "Computer Vision: A Modern Approach", by Forsyth, D. A., and Ponce, J. Relevant portions of these books are incorporated herein by reference in their entireties. Because of the known nature of these calibration methods, additional discussion thereof is not provided herein for the sake of brevity.

The interactive graphical display or interface 35 in FIG. 3 may be a result of the video data processing by the face mining software 10 according to one embodiment of the present disclosure. Various software modules (e.g., modules 26, 28, 30, and 33 in FIG. 3) in the face mining software 10 may process the input video data to generate the interactive graphical display 35. The interactive graphical display 35 may be physically displayed on a display monitor or computer screen (e.g., the screen or video display terminal of the face mining terminal 16 in FIG. 2). In one embodiment, the interactive graphical display 35 may perform one or more of the following functions: a) list all people present in the input video 12, b) provide information known about each person in the video 12, c) provide the ability to select and view (person-specific) video segments in which each person is present, d) provide the ability to input and store text information associated with each person and/or person-specific video, e) provide the ability to enroll and remove people in the face database 31, f) provide a link graph of the co-occurrences of various people in the input video 12, g) provide a visualization of people's movement through a facility by overlaying paths of their movement on a map (of the facility), and h) provide the ability to manually match people to the database 31 and remove incorrect matches. The foregoing functions are discussed hereinbelow with reference to various display screens shown in FIGS. 4-10.

Figure 4:
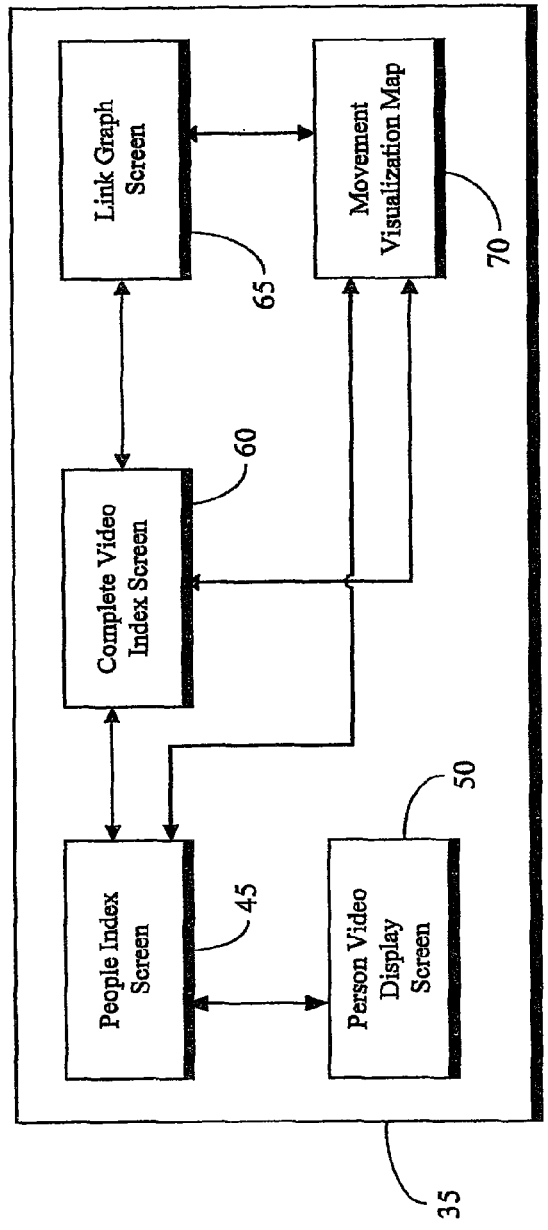
FIG. 4 shows various exemplary display screens of the interactive graphical display/interface and their interrelationships according to one embodiment of the present disclosure.

FIG. 4 shows various exemplary display screens 45, 50, 60, 65, and 70 of the interactive graphical display/interface 35 and their interrelationships according to one embodiment of the present disclosure. These display screens may constitute the components of the interactive graphical display 35 as indicated in FIG. 4. In the embodiment of FIG. 4, the exemplary display screens include: a people index screen 45, a person video display screen 50, a complete video index screen 60, a link graph screen 65, and a movement visualization map 70. As mentioned before, various functionalities discussed in the preceding paragraph may be implemented through one or more of these display screens as explained later in more detail hereinbelow.

Figure 5:
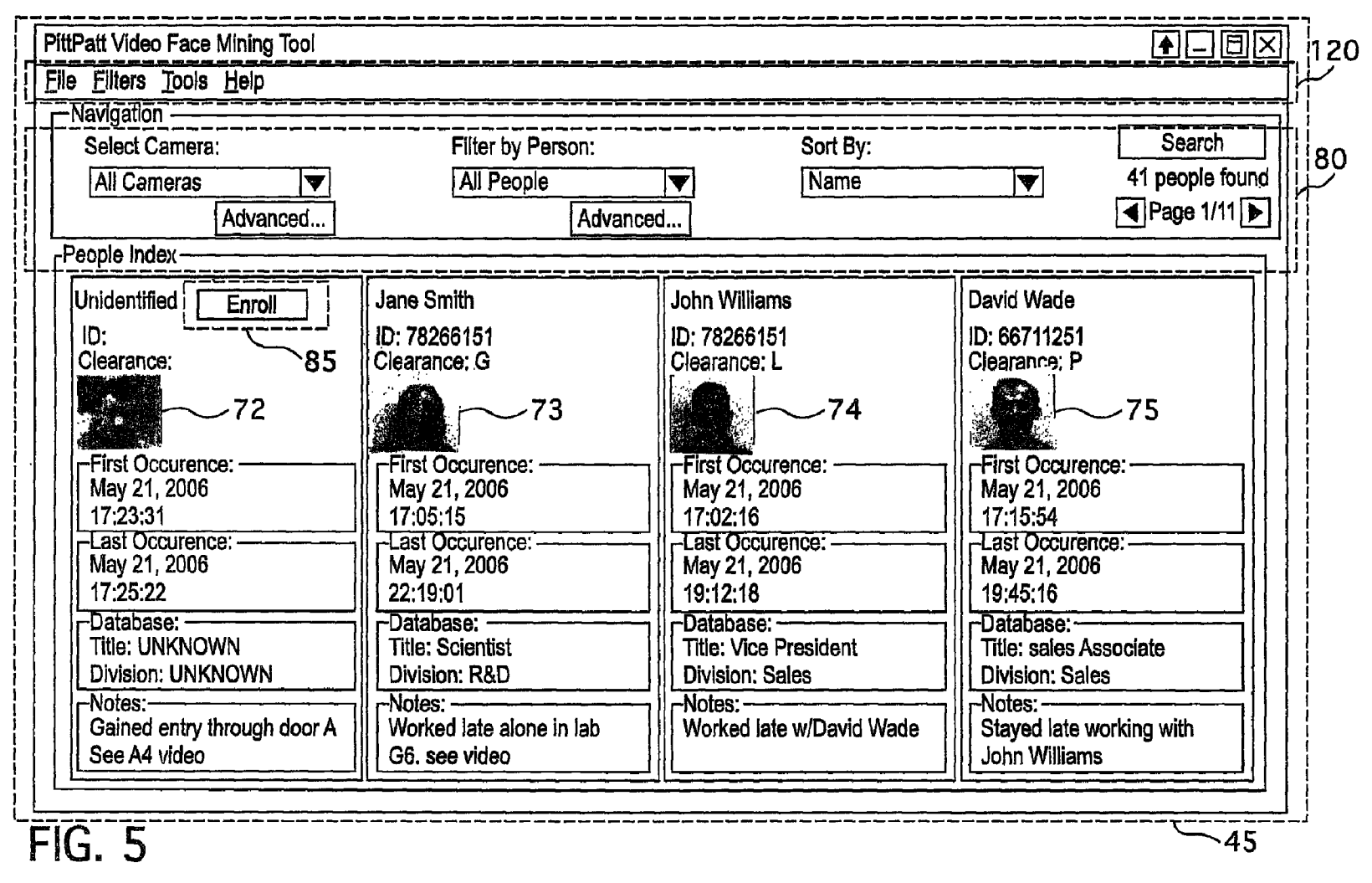

FIG. 5 illustrates an exemplary implementation of the people index screen 45 in the interactive graphical interface 35. The people index screen 45 may show thumbnail images 72-75 representing each person that appears in the selected video data 12. In this screen interface 45, each unique person is represented by a single thumbnail face image. The display in the screen 45 may include text including the Person Record mentioned hereinbefore and describing each person, including, for example, the person's name, security clearance level, first time of appearance in the video data 12, last time of appearance, as well as a notes field that can be input and stored by a user using suitable data input means (e.g., a computer mouse or keyboard). As part of the display of the people index screen 45, the face mining software 10 may retrieve various fields in the Person Record from the database 31 when a successful match is made between the faces in the merged face track (i.e., merged or grouped video frames containing the specific face at issue) and the records of face images in the database 31. Each thumbnail 72-75 in the people index screen 45 may be a hyperlink or a cueing link to the person's video display screen 50 as discussed in more detail hereinbelow.

A thumbnail image in the people index screen 45 can be selected in a number of ways, such as, for example, the thumbnail image of the video frame in which the face appears at the highest resolution, the thumbnail image of the first video frame in which the face appears, the most frontal upright view of the face in the face-specific set of video frames, and the face detected with the highest confidence. In one embodiment, the highest resolution frontal face is chosen as the thumbnail representation where the face detection confidence exceeds 75% of the highest confidence for the face track in which the face appears. If there are no detections that meet this criterion, than the detection with the next highest confidence may be chosen.

The people index screen 45 may have the capability to display people lists in a variety of orderings such as, for example, alphabetical, temporal (e.g., time of initial appearance in the video data 12), and length of duration (of appearance in the video data 12). For example, a user interacting with the people index screen 45 may only want to list unknown (i.e., unmatched or unrecognized) people and/or a selected set of source videos and/or cameras. The selection controls 80 in FIG. 5 are an example of how various user-selectable functionalities can be implemented. In addition, it may be desirable for the user to have the ability to manually enroll unidentified people in the database 31 for future identification. One way this can be implemented is by an interface that is activated when the user clicks on an enroll button 85 that may be provided as part of the people index screen 45. It also may be desirable for the user to have the capability to manually overrule a facial image match made between a merged face track and an image entry in the database 31. This can be implemented by an interface activated when a user clicks on the person's name displayed in the people index screen 45. Additional suitable functionalities may be devised as desired by one skilled in the art.

Figure 6:
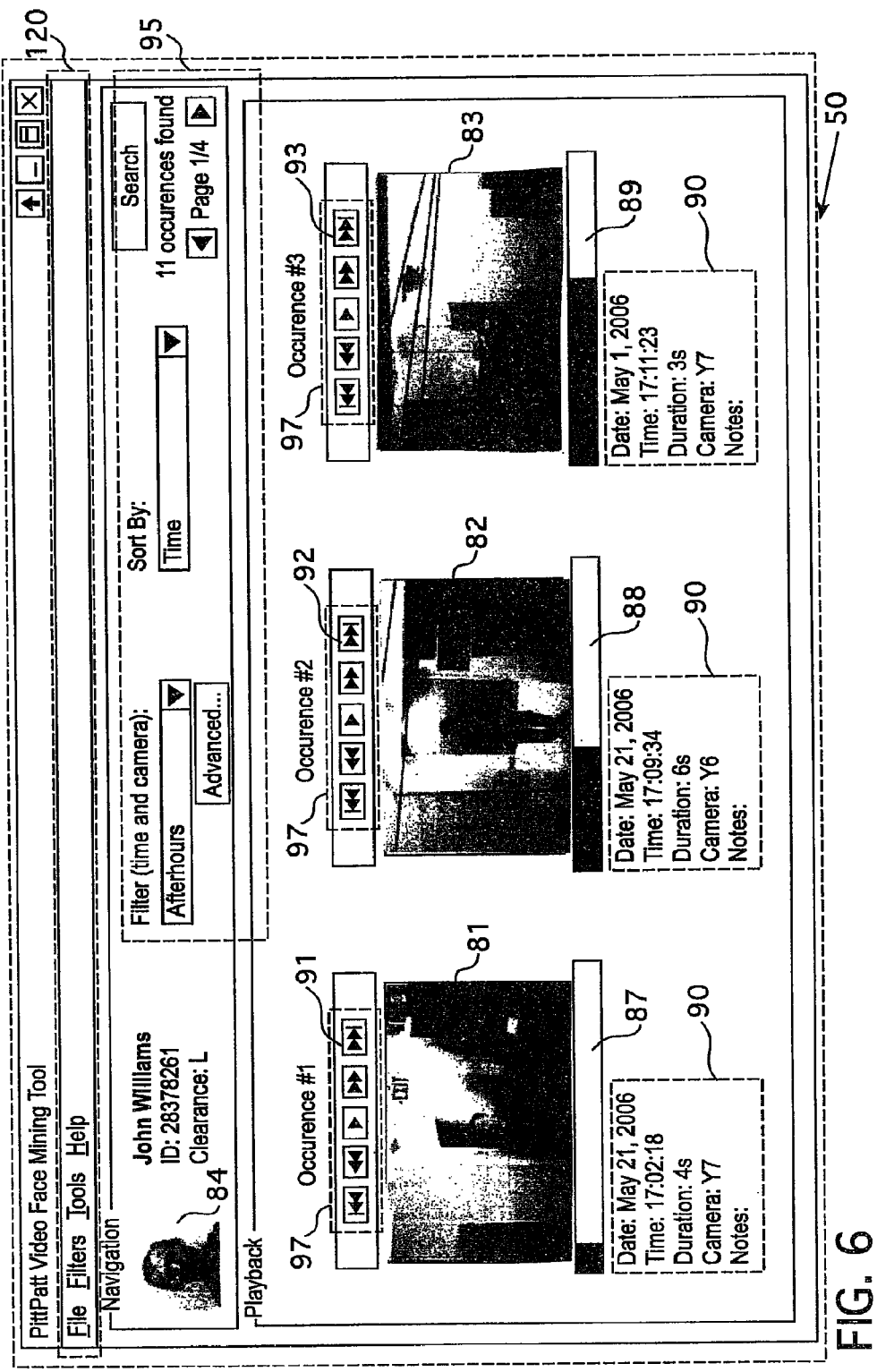
FIG. 6 depicts an exemplary implementation of the person's video display/navigation screen in the interactive graphical interface.

FIG. 6 depicts an exemplary implementation of the person's video display/navigation screen 50 in the interactive graphical interface 35 in FIG. 4. The screen 50 may display thumbnail images 81-83 representing video segments in the input video data 12 in which the selected person 84 is present. In one embodiment, selection controls 95 allow selection of video sources and ordering of the videos as shown in FIG. 6. A text description record or "text record" 90 may accompany each thumbnail image providing information about the corresponding video segment, for example, the time of the shot and the identity of the video/camera source. The text record 90 may also include a "Notes" field that can be input and modified by a user using, for example, a suitable data input means (e.g., a computer mouse or keyboard). In one embodiment, clicking (using, for example, a computer mouse pointer) on any thumbnail 81-83 plays the associated video segment through a control interface 97 that provides video control functionality, such as, for example, the option to rewind, fast-forward, a frame-by-frame rewind, etc. Thus, a thumbnail image of a face may function as a cueing link to the face-specific video segment in the input video data 12. Multiple video segments can be viewed simultaneously. For example, in the embodiment of FIG. 6, three such video segments are shown being viewed simultaneously as indicated by the rectangular progress bars/meters 87-89 below the video images 81-83 in the screenshot 50 of FIG. 6. In the case where some or all the video is available live, clicking on the far right buttons 91-93 in these controls 97 may switch to the live or near-live view from the selected camera of the person-specific video segments in which the selected person appears. As discussed hereinbefore, such video segments are selected based on face detection techniques implemented in substantially real time to process the incoming video frames.

Figure 7:
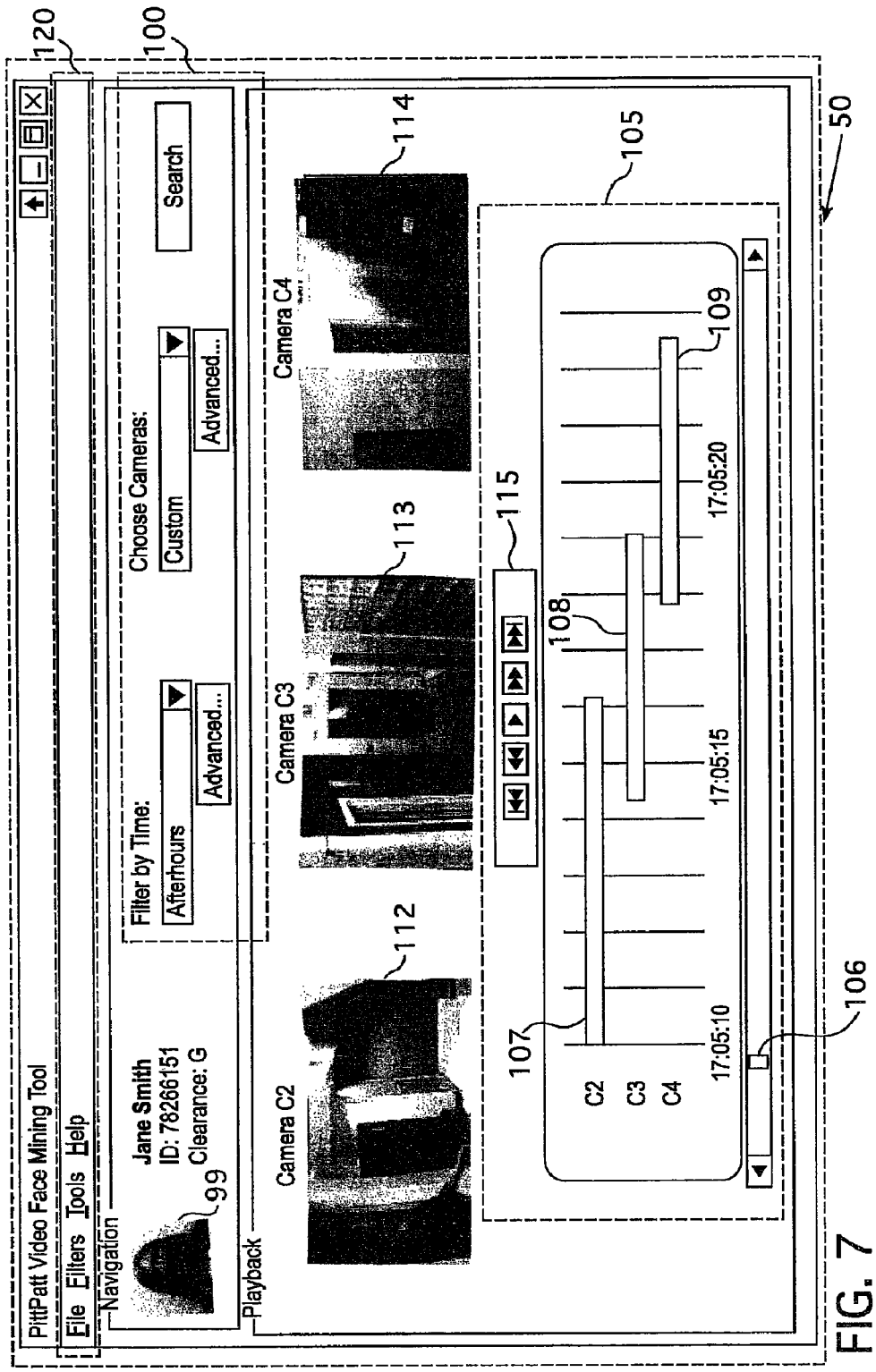
FIG. 7 shows an alternative exemplary implementation of the person's video display/navigation screen according to one embodiment of the present disclosure.

FIG. 7 shows an alternative exemplary implementation of the person's video display/navigation screen 50 according to one embodiment of the present disclosure. In the embodiment of FIG. 7, selection controls 100 allow selection of video sources and time intervals. The screen 50 in FIG. 7 may be used to play the selected video segments associated with the selected person 99 in, for example, a chronological order. If the subject 99 is present in more than one video at a time, those videos 112-114 may be shown simultaneously in temporal alignment. In one embodiment, the video screen windows 81-83 (FIG. 6) may function as video screen portions 112-114. In another embodiment, upcoming and completed video segments appear as thumbnail images, if screen space permits. Video controls 105 may be supplied as shown in FIG. 7, including a slider bar 106 representing the complete time interval during which the subject 99 is present in the corresponding video. By moving the slider bar 106, a user can go to desired video portion. For example, in the display of FIG. 7, it is seen that the person of interest is present in the field of view of camera C2 from 5:05:10 PM to 5:05:15 PM as indicated by the duration bar 107 associated with camera C2 in the control section 105. Similarly, the same person is present in the field of view of camera C3 from around 5:05:14 PM to 5:05:19 PM as indicated by respective duration bar 108, and in the field of view of camera C4 from around 5:05:18 PM to around 5:05:23 PM as indicated by respective duration bar 109. The slider bar 106 below this duration display may be moved to view the desired time-specific video portions (from a single camera or two or more cameras when the person is present in fields of view of all the cameras simultaneously). In one embodiment, in the case where some or all the video data is available live, moving the slider 106 to the extreme right or selecting the top right button 115 in controls 105 may switch to the live view from the selected cameras.

Figure 8:
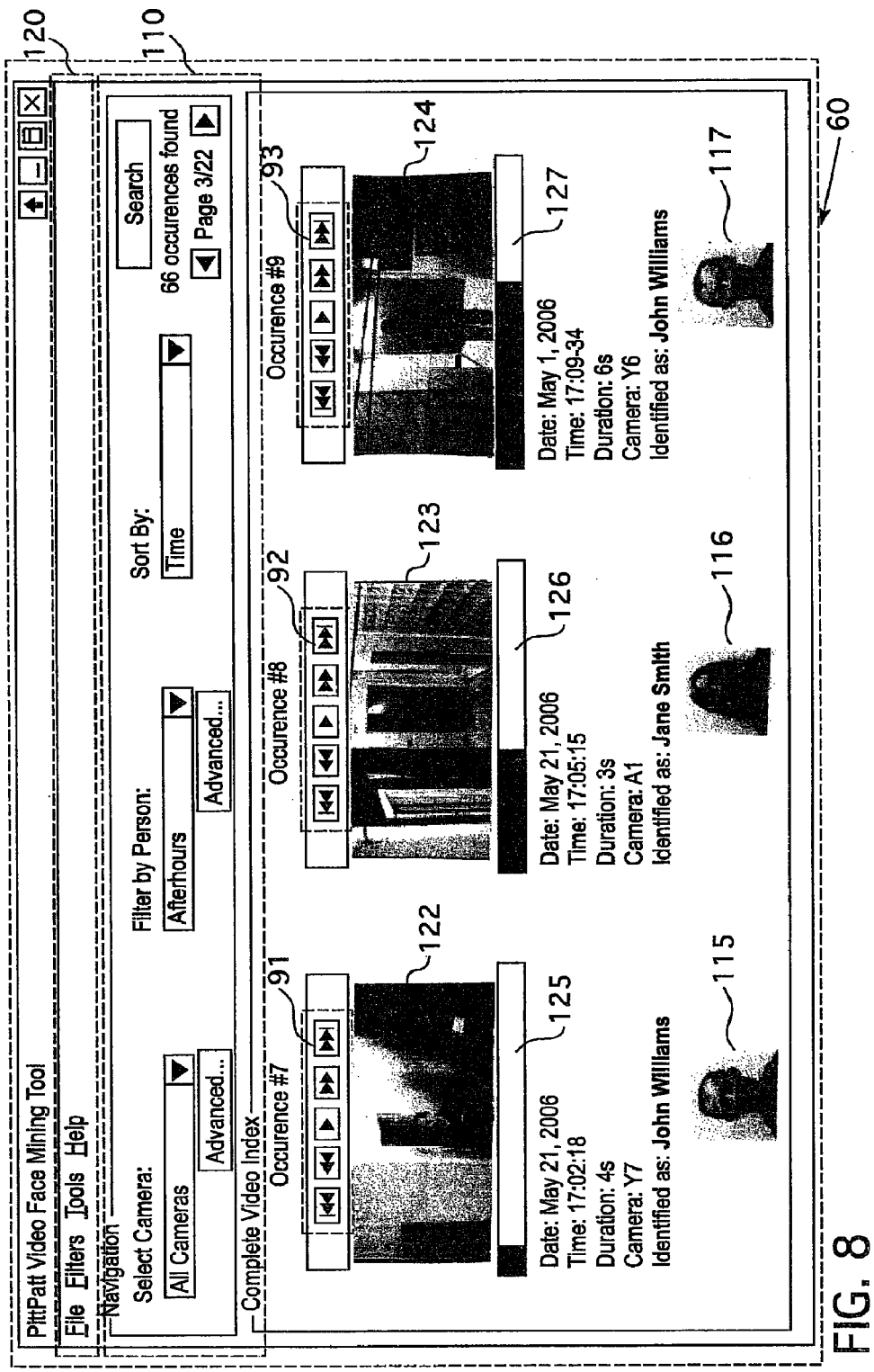
FIG. 8 is an exemplary implementation of the complete video index/navigation screen in the interactive graphical display.

FIG. 8 is an exemplary implementation of the complete video index/navigation screen 60 in the interactive graphical display 35 (FIG. 4). This screen 60 displays thumbnails 115-117 linked directly to video segments 122-124 for multiple people. Clicking on any thumbnail 115-117 results in playing of the video segment 122-124 through an interface 97 that provides video control functionality (e.g., rewind, fast-forward, etc) as noted hereinbefore. In one embodiment, multiple videos can viewed simultaneously as indicated by the progress bars 125-127 associated with corresponding video segment display windows 122-124. It is observed that the displays 122-124 and the progress bars 125-127 may be functionally equivalent to the displays 81-83 and corresponding progress bars 87-89 displayed in the person's video display screen 50 in the embodiment of FIG. 6. In the case where some or all the video is available live, clicking on the far right buttons 91-93 in these controls 97 may switch to the live view from the selected camera as mentioned hereinbefore. In the embodiment of FIG. 8, the selection controls 110 allow selection of video sources, people, and various means for sorting video as shown. Each video segment may be presented on a global time line (0 to 24 hrs).

Figure 9:
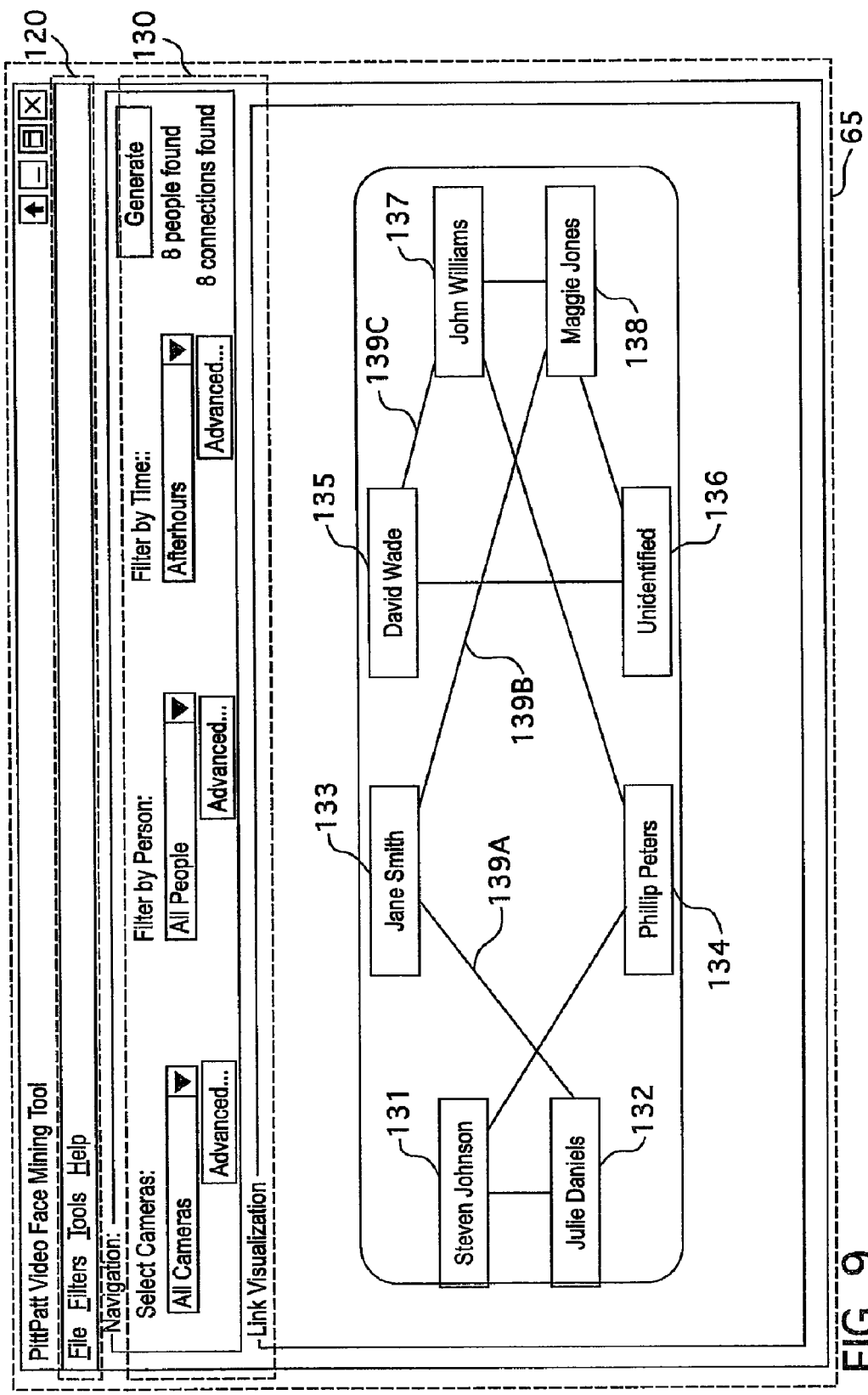
FIG. 9 illustrates an exemplary link graph screen in the interactive graphical display.

In one embodiment, the interactive interface 35 (FIG. 4) also has the ability to provide information about the interactions among the people in the video data 12. The face mining software 10 may be configured so that the interface 35 automatically generates a link graph screen 65 in which the joint appearances of people are visualized in a graph format. FIG. 9 illustrates an exemplary link graph screen 65 in the interactive graphical display 35. In the embodiment of FIG. 9, the nodes 131-138 in the link graph screen 65 represent people and a joint appearance of the two people anywhere in the video data 12 is represented by an edge or a link (e.g., the links 139A-139C) joining the nodes. In one embodiment, the links may be dimensionally-weighted. For example, in the embodiment of FIG. 9, the thickness of an edge or link can represent the amount of interaction between the two persons represented by the nodes connected by the link. Where there is a brief interaction between two linked persons, the link may be a thin link (e.g., the link 139A); however, longer duration or multiple interactions may be represented by a thicker edge (e.g., the links 139B and 139C). The display 65 may have the capability to create graphs selectively using the selection controls 130, where, for example, the display 65 may be configured to graph only unknown or unmatched/unrecognized people and/or a selected set of source videos and/or a limited duration of time as provided by the exemplary controls 130 shown in FIG. 9.

Figure 10:
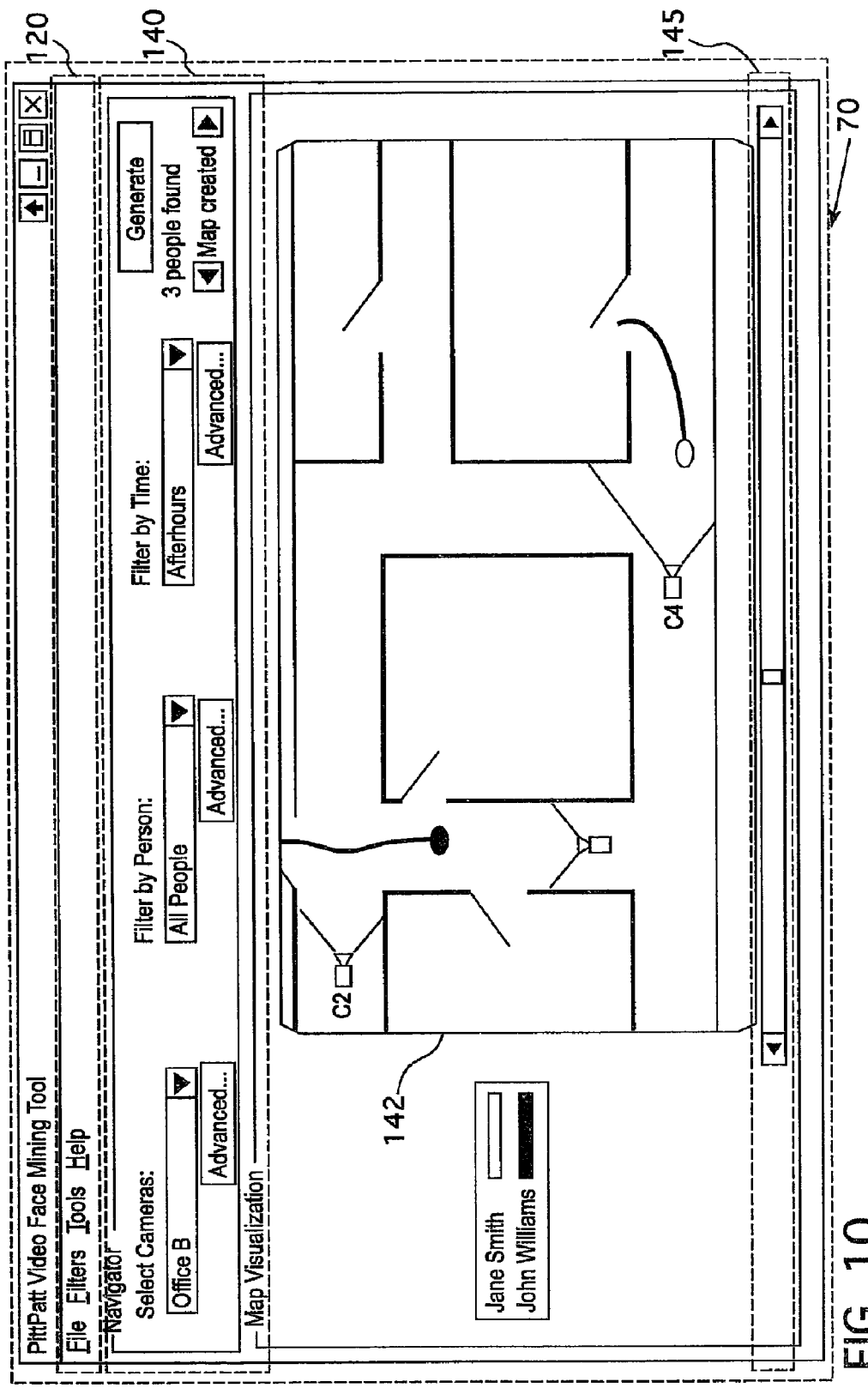
FIG. 10 shows an example of the movement visualization map in the interactive graphical interface according to one embodiment of the present disclosure.

Often, for security applications, the video sources (e.g., surveillance cameras) may be distributed over a facility or site, such as an office building or a military installation. In these scenarios, the positional relationship of the cameras to the site is often known or can be determined. When this is the case, each face found in the video (taken by the installed cameras) can be associated to a position within the facility as described above. In one embodiment, the interactive interface 35 may be configured to display movements of people within the site by representing people's movements as paths visualized on two-dimensional maps of the facility. FIG. 10 shows an example of the movement visualization map 70 in the interactive graphical interface 35 according to one embodiment of the present disclosure. The movement visualization screen 70 in FIG. 10 illustrates how the movement paths of people can be visualized with respect to the map of a site. As shown in FIG. 10, the display 70 may be configured to display these paths selectively by person, video/camera source, and by time, using the selection controls 140 (which are similar to the selection controls 130 in FIG. 9). A slider bar 145 at the bottom of the movement visualization display 70 may be used to control visualization as a function of time. In the visualization map 142 of FIG. 10, movements of two people are plotted with reference to and along with the corresponding map of the site and camera locations.

In one embodiment, the interactive interface 35 also has the ability to easily switch between the various screens and interfaces described hereinabove and as visually indicated by the linked screens (as depicted by arrows linking the screens) in FIG. 4. It is seen from the display screens in FIGS. 5 through 10 that an exemplary menu bar 120 may be provided for menu options that allow for easy switching among the views shown in FIGS. 5-10.

It is noted from the foregoing discussion that the face mining approach according to the teachings of the present disclosure may be different from traditional video indexing systems based on keyframes, which segment video into non-overlapping segments and use a single keyframe image to represent each segment of video. A discussion of such conventional video indexing systems may be found in the U.S. Pat. No. 6,711,587 to Dufaux, F., titled "Keyframe Selection to Represent a Video" and in the U.S. Patent Application Publication No. US2006/0110128 to Dunton et al., titled "Image-key index for Video Program Stored in Personal Video Recorder." On the other hand, the face mining software 10 according to one embodiment of the present disclosure may segment video into many overlapping segments (depending on the detection of human faces and their segment-wise presence) and may also provide an index for every face/person found in the video, rather than an index only to a segment of the video data.

In one embodiment, the teachings of the present disclosure may be extended to devise a methodology to track non-human objects (e.g., automobiles, animals, etc.) in video data. For example, a detector (not shown) may be trained to detect cars in an incoming video data taken from a camera at a street light junction. Similar to the face mining application 10, a car or other automobile tracking software may be devised to enable a user to track a specific car in the recorded video (e.g., as part of police surveillance of a stolen vehicle) using the principles of the face detection-based video mining application discussed herein. Such tracking may be performed in real time or near real time to assist law enforcement authorities without spending a huge amount of time in sorting through the video data using conventional methods. The resultant car-specific video segments may be selectively picked from the input video and automatically shown to the relevant authorities to expedite further actions.

The present disclosure relates to an apparatus and method for searching and monitoring video data by automatically creating an index of the people who appear in the video. People in the video are identified using their faces. For each such person, the system automatically provides the means for viewing only those video segments (from the entire video data) in which that person appears. Thus, a random, person-specific search of relevant segments in a video data containing many people may be carried out to track movement or activity of a person throughout the captured video. Because multiple people may be present at any one time in video, the system may provide multiple indices to particular video segments. A face mining method according to one embodiment of the present disclosure may include one or more of the steps of finding faces in individual video frames, grouping the found faces to unique people, matching face data for each unique person to a database of face images thereby associating a data record to each matched person, charting movement and interaction of people with respect to a facility map (e.g., map of a warehouse or an office complex), and presenting an interactive display. The face-specific video segments identified from the input video may be automatically shown to a user or a link or similar cueing information to access those segments may be furnished to the user.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method for processing video data, comprising:
   detecting human faces in a plurality of video frames in said video data using a processor;
   for at least one detected human face, identifying a face-specific set of video frames using said processor, irrespective of whether said detected human face is present in said face-specific set of video frames in a substantially temporally continuous manner;
   grouping video frames in said face-specific set of video frames into a plurality of face tracks using said processor, wherein each face track contains corresponding one or more video frames having at least a substantial temporal continuity therebetween;
   using said processor, merging two or more of said plurality of face tracks that are disjoint in time using a face recognition method based on a Bayesian Network based classifier, wherein the Bayesian Network based classifier is constructed based on a ratio of a plurality of Bayesian networks and each of said Bayesian networks is a probability distribution representation derived from dependencies among video input variables that statistically depend upon each other; and
   enabling a user to view on an electronic display face-specific video segments of said at least one detected human face in said video data based on said merging of temporally disjoint face tracks.

2. The method of claim 1, wherein said grouping is carried out in a temporally sequential manner based on respective time stamps associated with said video frames in each said face-specific set of video frames.

3. The method of claim 1, further comprising:
   displaying a representative image for said grouped video frames on said electronic display.

4. The method of claim 1, further comprising:
   allowing said user to manually associate respective grouped video frames in said face-specific set of video frames with an image entry stored in a database using said processor.

5. The method of claim 1, further comprising:
   allowing said user to manually override a match between respective grouped video frames in said face-specific set of video frames and an image entry stored in a database using said processor.

6. The method of claim 1, further comprising:
   matching grouped video frames with image entries stored in a database using said processor; and
   using said processor, enrolling unmatched grouped video frames into said database through corresponding image entries.

7. The method of claim 1, further comprising:
   using said processor, indicating one or more unmatched human faces in said detected human faces based on a comparison of said detected human faces against a plurality of human face images stored in a database; and
   enabling said user to view on said electronic display those face-specific video segments wherein said one or more unmatched human faces are present.

8. The method of claim 1, further comprising:
   displaying on said electronic display a representative image for at least one video frame in said face-specific set of video frames for said at least one detected human face.

9. The method of claim 8, further comprising:
   enabling said user to view said face-specific video segments on said electronic display using said representative image as a link therefor.

10. The method of claim 8, further comprising:
retrieving a textual description for said face-specific video segments from a database using said processor; and
displaying said textual description along with said representative image on said electronic display.

11. The method of claim 1, further comprising:
enabling said user to input a textual description of said face-specific video segments associated with said at least one detected human face using said processor.

12. The method of claim 1, wherein said identifying includes using face recognition to identify said face-specific set of video frames for said at least one detected human face.

13. The method of claim 1, further comprising:
automatically displaying said face-specific video segments on said electronic display upon identification of said face-specific set of video frames for said at least one detected human face.

14. The method of claim 1, further comprising:
using said processor, determining movement of said at least one detected human face in said face-specific video segments associated therewith using a three-dimensional coordinate system.

15. The method of claim 14, further comprising:
displaying said movement of said at least one detected human face with respect to a map on said electronic display.

16. The method of claim 1, further comprising:
displaying a co-occurrence of two human faces in said plurality of video frames as a link graph on said electronic display, wherein said link graph includes a plurality of nodes, and wherein each node in said link graph represents a different detected human face in said plurality of video frames regardless of identification status of said detected human face.

17. The method of claim 16, wherein said link graph includes a plurality of dimensionally-weighted links, wherein each link connects a pair of nodes from said plurality of nodes, and wherein weighting of each said link is proportional to the amount of interaction between two humans represented as nodes connected by said link.

18. A method for processing video data, comprising:
detecting human faces in a plurality of video frames in said video data using a processor;
indicating, using said processor, one or more unmatched human faces in said detected human faces based on a comparison of said detected human faces against a plurality of human face images stored in a database; and
using said processor, tracking at least one unmatched human face across said video data by locating a face-specific set of video frames therefor using a face recognition method based on a Bayesian Network based classifier, irrespective of whether said unmatched human face is present in said face-specific set of video frames in a substantially temporally continuous manner, wherein the Bayesian Network based classifier is constructed based on a ratio of a plurality of Bayesian networks and each of said Bayesian networks is a probability distribution representation derived from dependencies among video input variables that statistically depend upon each other.

19. The method of claim 18, wherein said tracking is performed in real time.

20. The method of claim 18, further comprising:
using said processor, automatically displaying face-specific video segments associated with said at least one unmatched human face based on said face-specific set of video frames located therefor.

21. The method of claim 18, further comprising:
grouping all video frames in said face-specific set of video frames located for said at least one unmatched human face using said processor; and
displaying a representative image for at least one video frame in said face-specific set of video frames using said processor.

22. A method for processing video data, comprising:
detecting objects in a plurality of video frames in said video data using a processor;
for at least one detected object, identifying an object-specific set of video frames using said processor, irrespective of whether said detected object is present in said object-specific set of video frames in a substantially temporally continuous manner;
grouping video frames in said object-specific set of video frames into a plurality of object tracks using said processor, wherein each object track contains corresponding one or more video frames having at least a substantial temporal continuity therebetween;
using said processor, merging two or more of said plurality of object tracks that are disjoint in time using an object recognition method based on a Bayesian Network based classifier, wherein the Bayesian Network based classifier is constructed based on a ratio of a plurality of Bayesian networks and each of said Bayesian networks is a probability distribution representation derived from dependencies among video input variables that statistically depend upon each other; and
enabling a user to view on an electronic display for said processor object-specific video segments of said at least one detected object in said video data based on said merging of temporally disjoint object tracks.

23. A method, comprising:
receiving video data from a user over a data communication network using a processor;
detecting human faces in a plurality of video frames in said video data using said processor;
for at least one detected human face, identifying a face-specific set of video frames using said processor, irrespective of whether said detected human face is present in said face-specific set of video frames in a substantially temporally continuous manner;
configuring said processor to use a face recognition method based on a Bayesian Network based classifier to identify those portions of said video data corresponding to said face-specific set of video frames wherein said at least one detected human face is present, wherein the Bayesian Network based classifier is constructed based on a ratio of a plurality of Bayesian networks and each of said Bayesian networks is a probability distribution representation derived from dependencies among video input variables that statistically depend upon each other; and
using said processor, sending cueing information for said portions of said video data to said user over said data communication network so as to enable said user to selectively view face-specific video segments in said video data associated with said at least one detected human face without a need to search said video data for said video segments.

24. The method of claim 23, further comprising:
indicating, using said processor, one or more unmatched human faces in said detected human faces;
using said processor, identifying only those portions of said video data wherein said one or more unmatched human faces are present; and sending cueing information for only said video portions associated with said one or more unmatched human faces to said user over said data communication network using said processor.

25. The method of claim 23, wherein said cueing information includes said face-specific video segments associated with only those of said detected human faces that are unmatched based on a database query.

26. The method of claim 23, further comprising:
charging a fee to said user for sending said cueing information.

27. The method of claim 23, wherein said data communication network is the Internet.

28. A data storage medium containing a program code, which, when executed by a processor, causes said processor to perform the following:
receive video data;
detect human faces in a plurality of video frames in said video data;
for at least one detected human face, identify a face-specific set of video frames irrespective of whether said detected human face is present in said face-specific set of video frames in a substantially temporally continuous manner;
group all video frames in said face-specific set of video frames into a plurality of face tracks, wherein each face track contains corresponding one or more video frames having at least a substantial temporal continuity therebetween;
merge two or more of said plurality of face tracks that are disjoint in time using a face recognition method based on a Bayesian Network based classifier, wherein the Bayesian Network based classifier is constructed based on a ratio of a plurality of Bayesian networks and each of said Bayesian networks is a probability distribution representation derived from dependencies among video input variables that statistically depend upon each other; and
enable a user to view face-specific video segments of said at least one detected human face in said video data based on said merger of temporally disjoint face tracks.

29. The data storage medium of claim 28, wherein said program code, upon execution by said processor, causes said processor to further perform the following:
indicate one or more unmatched human faces in said detected human faces based on a comparison of said detected human faces against a plurality of human face images stored in a database; and
track at least one unmatched human face across said video data in substantially real time through said face-specific set of video frames therefor.

30. The data storage medium of claim 29, wherein said program code, upon execution by said processor, causes said processor to further perform the following:
automatically display face-specific video segments associated with said at least one unmatched human face based on said face-specific set of video frames therefor.

31. The data storage medium of claim 29, wherein said program code, upon execution by said processor, causes said processor to further perform the following:
display a cueing link for said face-specific set of video frames associated with said at least one unmatched human face so as to enable said user to view only those face-specific video segments in said video data wherein said at least one unmatched human face appears without requiring said user to search said video data for said video segments of said at least one unmatched human face.

32. A system for processing video data, comprising:
means for detecting human faces in a plurality of video frames in said video data;
for at least one detected human face, means for identifying a face-specific set of video frames irrespective of whether said detected human face is present in said face-specific set of video frames in a substantially temporally continuous manner;
means for grouping all video frames in said face-specific set of video frames into a plurality of face tracks, wherein each face track contains corresponding one or more video frames having at least a substantial temporal continuity therebetween;
means for merging two or more of said plurality of face tracks that are disjoint in time using a face recognition method based on a Bayesian Network based classifier, wherein the Bayesian Network based classifier is constructed based on a ratio of a plurality of Bayesian networks and each of said Bayesian networks is a probability distribution representation derived from dependencies among video input variables that statistically depend upon each other; and
means for displaying face-specific video segments of said at least one detected human face in said video data based on said merger of temporally disjoint face tracks.

33. The system of claim 32, further comprising:
means for indicating one or more unmatched human faces in said detected human faces;
means for identifying those portions of said video data wherein said one or more unmatched human faces are present; and
means for automatically displaying face-specific video segments in said video data associated with said one or more unmatched human faces based on said video data portions identified for said one or more unmatched human faces.

34. A computer system, which, upon being programmed, is configured to perform the following:
receive video data;
detect human faces in a plurality of video frames in said video data;
for at least one detected human face, identify a face-specific set of video frames irrespective of whether said detected human face is present in said face-specific set of video frames in a substantially temporally continuous manner;
group all video frames in said face-specific set of video frames into a plurality of face tracks, wherein each face track contains corresponding one or more video frames having at least a substantial temporal continuity therebetween;
merge two or more of said plurality of face tracks that are disjoint in time using a face recognition method based on a Bayesian Network based classifier, wherein the Bayesian Network based classifier is constructed based on a ratio of a plurality of Bayesian networks and each of said Bayesian networks is a probability distribution representation derived from dependencies among video input variables that statistically depend upon each other; and
enable a user to view face-specific video segments of said at least one detected human face in said video data based on said merger of temporally disjoint face tracks.

35. A system for processing video data, comprising:
a computing unit; and
a data storage medium containing a program code, which, when executed by said computing unit, causes said computing unit to perform the following:

receive video data;

detect human faces in a plurality of video frames in said video data;

for at least one detected human face, identify a face-specific set of video frames irrespective of whether said detected human face is present in said face-specific set of video frames in a substantially temporally continuous manner; and use a face recognition method based on a Bayesian Network based classifier to enable a user to view face-specific video segments in said video data based on said face-specific set of video frames identified, wherein the Bayesian Network based classifier is constructed based on a ratio of a plurality of Bayesian networks and each of said Bayesian networks is a probability distribution representation derived from dependencies among video input variables that statistically depend upon each other.

36. The system of claim 35, further comprising:

a video data source to provide said video data, wherein said video data source is one of the following:

a portion of said computing unit configured to record said video data; and a video camera coupled to said computing unit.

37. A system for processing video data, comprising:

a video data source connected to a communication network, wherein said video data source is configured to transmit video data over said communication network; and a computing unit in communication with said video data source and connected to said communication network, wherein said computing unit is configured to perform the following:

receive said video data from said video data source transmitted over said communication network;

detect human faces in a plurality of video frames in said video data;

for at least one detected human face, identify a face-specific set of video frames irrespective of whether said detected human face is present in said face-specific set of video frames in a substantially temporally continuous manner; and use a face recognition method based on a Bayesian Network based classifier to send cueing information for said face-specific set of video frames to said user over said data communication network so as to enable said user to selectively view face-specific video segments in said video data associated with said at least one detected human face without a need to search said video data for said video segments, wherein the Bayesian Network based classifier is constructed based on a ratio of a plurality of Bayesian networks and each of said Bayesian networks is a probability distribution representation derived from dependencies among video input variables that statistically depend upon each other.

38. The system of claim 37, wherein said video data source is at least one of the following:

a computing unit having a built-in means to record said video data;

a video camera; and a computing unit having said video data stored therein prior to transmission over said communication network.

* * * * *